United States Patent
Espeseth et al.

(10) Patent No.: US 7,847,193 B2
(45) Date of Patent: Dec. 7, 2010

(54) CURRENT CONDUCTOR FOR AN ELECTRICAL DEVICE, ESPECIALLY BUS BAR CONDUCTOR FOR AN ELECTRICAL MEDIUM VOLTAGE INSTALLATION

(75) Inventors: Robert Espeseth, Skien (NO); Ole Granhaug, Skien (NO); Silvio Stangherlin, Birmensdorf (CH); Gerhard Salge, Mettmann (DE); Jan-Henrik Kuhlefelt, Skien (NO); Thor Endre, Skien (NO)

(73) Assignee: ABB Technology AG, Zurich (CH)

( * ) Notice: Subject to any disclaimer, the term of this patent is extended or adjusted under 35 U.S.C. 154(b) by 276 days.

(21) Appl. No.: 12/162,314

(22) PCT Filed: Jan. 24, 2007

(86) PCT No.: PCT/EP2007/000565

§ 371 (c)(1),
(2), (4) Date: Jul. 25, 2008

(87) PCT Pub. No.: WO2007/085424

PCT Pub. Date: Aug. 2, 2007

(65) Prior Publication Data
US 2009/0000817 A1 Jan. 1, 2009

(30) Foreign Application Priority Data
Jan. 25, 2006 (DE) .................. 10 2006 003 432

(51) Int. Cl.
*H01B 17/00* (2006.01)
(52) U.S. Cl. .................. 174/149 R; 174/149 B
(58) Field of Classification Search ........... 174/68.1, 174/68.2, 70 B, 149 R, 149 B; 264/263, 264/273–275; 361/611, 639, 658; 439/212
See application file for complete search history.

(56) References Cited

U.S. PATENT DOCUMENTS

| 3,916,089 | A | | 10/1975 | Sloan |
| T973,010 | I4 | | 8/1978 | McDonald et al. |
| 4,404,423 | A | | 9/1983 | Sakakibara et al. |
| 4,822,951 | A | * | 4/1989 | Wilson et al. .............. 174/68.2 |
| 6,069,321 | A | * | 5/2000 | Wagener et al. ............ 174/99 B |
| 6,664,478 | B2 | * | 12/2003 | Mohan et al. ............ 174/149 B |
| 6,805,226 | B1 | | 10/2004 | Ross et al. |

FOREIGN PATENT DOCUMENTS

| DE | 3137783 | 6/1982 |
| DE | 10121584 | 6/2002 |
| DE | 10114715 | 10/2002 |
| EP | 0345910 | 12/1989 |
| EP | 572096 | 12/1993 |
| JP | 05081952 | 4/1993 |

* cited by examiner

OTHER PUBLICATIONS

ABB Calor Emag "Schaltanlagen" [switching stations], 10th edition, p. 397, Fig. 8-24 (Concise statement in specification at paragraph [0002]).

*Primary Examiner*—William H Mayo, III
(74) *Attorney, Agent, or Firm*—Leydig, Voit & Mayer, Ltd.

(57) ABSTRACT

A current conductor for an electrical device including an electrically conducting central section having a first side and a second side. The central section is configured to receive at least one inserted electrical component. Two electrical conducting shield sections are each disposed on one of the first side and the side and configured to shield against an electric field. The shield sections cover the central section and the at least one inserted electrical component.

19 Claims, 2 Drawing Sheets

CURRENT CONDUCTOR FOR AN ELECTRICAL DEVICE, ESPECIALLY BUS BAR CONDUCTOR FOR AN ELECTRICAL MEDIUM VOLTAGE INSTALLATION

CROSS REFERENCE TO PRIOR APPLICATIONS

This application is a U.S. National Phase application under 35 U.S.C. §371 of International Application No. PCT/EP2007/000565, filed on Jan. 24, 2007 and claims benefit to German Patent Application No. DE 10 2006 003 432.5, filed on Jan. 25, 2006. The International Application was published in German on Aug. 2, 2007 as WO 2007/085424.

BACKGROUND

The present invention concerns a current conductor for an electrical device, especially a bus bar conductor for an electrical medium voltage switching station.

Known medium voltage switching stations have a current conductor which has one or two ribbon conductors which are adjacent to each other, and with which shield sections, which are formed by semicircular profiles on both sides of the ribbon conductor, are associated; see ABB Calor Emag Taschenbuch (pocket book), Schaltanlagen (switching stations), 10th edition, page 397, FIG. 8-24.

From EP 572 096, a bus bar conductor system for high voltage systems, wherein three bus bars, each consisting of two bus bar sections in the shape of an arc of a circle, are fixed to a support, so that because of the shape a suitable field distribution is achieved, has been described. Such an arrangement is intended for high voltage, but not for medium voltage, which can be seen in particular in the fact that the bus bars are housed in metal cladding which is characteristic of high voltage installations.

From DE 31 37 783 A1, a gas-insulated three-phase current bus bar system, which in one alternative has a cylindrical shape which is divided in the region of a surface line, has been described; on the end edges facing each other, lugs, which project inwards, and via which connecting conductors, in particular connecting cables, can be connected with suitable fixing elements, are formed. In another arrangement which is also described in this published specification, the bus bar consists of two sections of semi-cylindrical form, the concave sides of which face each other, the two sections being fixed to each other by means of a connecting device on one surface line, and it being possible to fix connecting elements for connecting cables and similar on the diametrically opposite surface line.

The construction of such bus bars or current conductors is complicated.

SUMMARY OF THE INVENTION

An aspect of the present invention is to provide a current conductor for an electrical device, especially a bus bar conductor for an electrical medium voltage installation, manufacture of said current conductor being simplified relative to the known device.

According to the present invention, the current conductor has a central section of electrically conducting material, and electrical components, e.g. connecting contact points and similar, or components of insulating material, in particular supporting elements, can be fixed to it. The present conductor also has, on both sides of the central section, connecting shield sections of electrically conducting material, which cover at least this and control the field, the shield sections also covering any inserted electrical components.

According to an advantageous version, at least the central section can be produced from electrically conducting material by extrusion. Additionally, the shield sections can also be produced from electrically conducting material by extrusion.

According to an advantageous version, the central section can be produced from electrically conducting material by extrusion, in one piece with the shield sections, in which case the electrically conducting material can be aluminum or an aluminum alloy.

However, there is also the possibility of producing the shield sections from electrically conducting plastic.

According to an advantageous version of the invention, the central section can have a base section which is extended lengthways, and on which, preferably perpendicularly to it, fins which are arranged at intervals from each other and project in the same direction are formed, their free ends being provided with transverse beads, between which the electrical components can be fixed. The base section can be in flat or arc-shaped form.

These transverse beads can each form an L or T shape with the fins, a sufficient distance for fixing the electrical components or any supporting elements being formed between the longitudinal edges, which face each other, of the transverse beads.

The shield sections can connect on the base section of the central section, and in a further embodiment can be formed in one piece with it.

In a further version of the invention, the shield sections can be formed of electrically conducting plastic.

Each shield section is approximately C-shaped, with the concave sides facing each other and receiving the central section between them.

The shield sections can be produced with each other in one piece, preferably of electrically conducting plastic, it being possible to lock the central section inside the shield sections.

BRIEF DESCRIPTION OF THE DRAWINGS

On the basis of the drawings, in which some embodiments of the invention are shown, the invention, and further advantageous versions, improvements and further advantages, will be explained and described in more detail.

DETAILED DESCRIPTION

Figure 1:
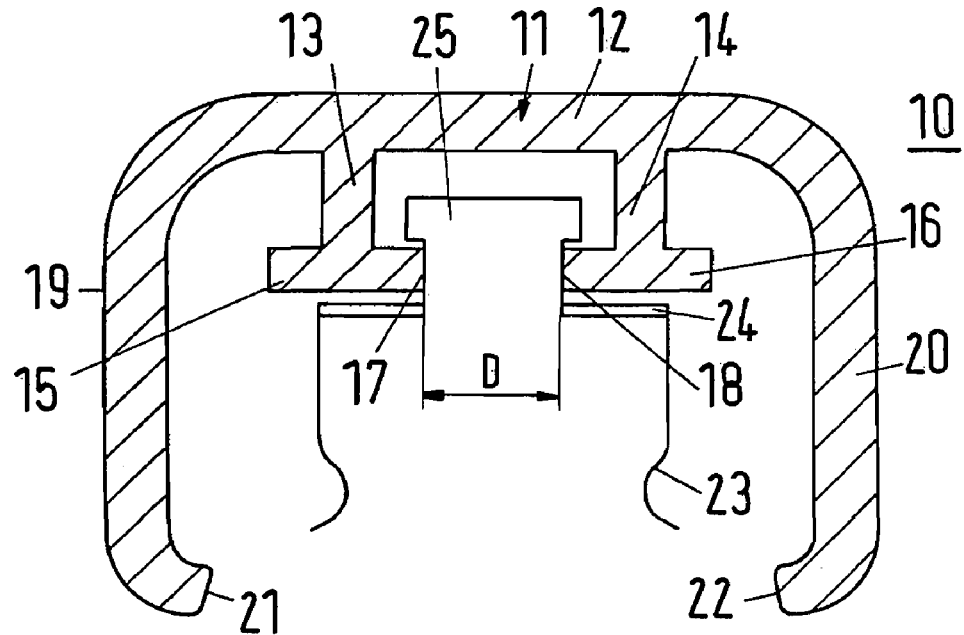
FIG. 1 shows a first embodiment of a bus bar in cross section.

A bus bar according to the invention, or a current conductor 10 according to the invention, has a central section 11, which has a base section 12 in the form of a ribbon conductor. Onto this base section 12, at intervals from each other and running perpendicular to it, fins 13 and 14, on the free ends of which transverse fins 15 and 16 are formed, the edges 17 and 18 of which, facing each other and having a distance D between them, are connected. On both sides of the base section 12, approximately C-shaped shield sections 19, 20, the free longitudinal edges 21 and 22 of which, facing each other, allow access to the central section 11, are connected.

Such an embodiment according to FIG. 1 can preferably be produced from aluminum by extrusion, without problems.

FIG. 1 shows an electrical contact point 23, which is in the form of a tulip contact point with fingers which are formed on a base plate 24. A T-shaped projection 25, which grips behind the edges 17 and 18 of the transverse fins 15 and 16, is provided on the base plate 24, so that the contact point 23 can be fixed on the central section 11. The contact point 23 can be locked on, or screwed tight or pushed-in in another suitable manner.

Figure 4:
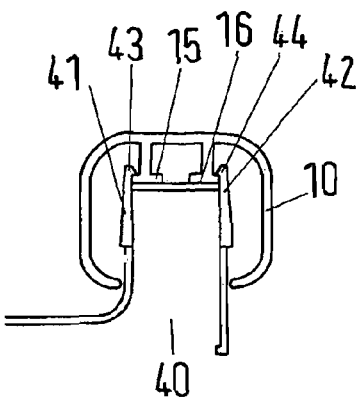
FIG. 4 shows a sectional view through the bus bar according to FIG. 1, and also shows a bus bar holder.
Figure 5:
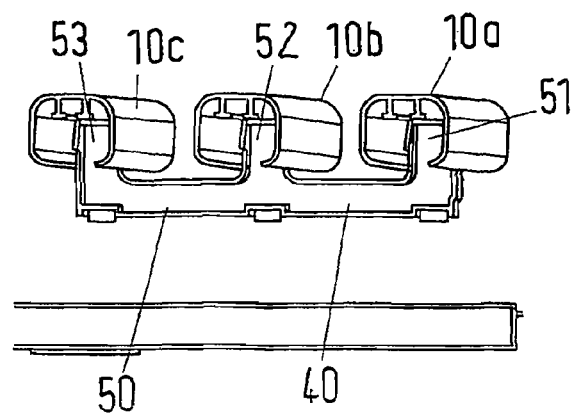
FIG. 5 shows three bus bars according to FIG. 1 on a single bus bar holder, similar to that of FIG. 4.

From FIGS. 4 and 5, it can be seen that the bus bar 10 can be fixed on a support 40 of insulating material. The support 40 of insulating material has elastic locking arms 41 and 42, which lock in behind the outer edge of the transverse fins 15 and 16 with their locking lugs 43 and 44, the two locking arms 41 and 42 receiving the transverse fins 15 and 16 between them.

The support 40 has, as can be seen in FIG. 5, a flat base 50 which is rectangular in cross section, and on which arms 51 to 53 are formed, so that the result is an E shape; the free ends of the arms 51 to 53 are in the form shown in FIG. 4, so that three bus bars 10a, 10b and 10c can be locked onto the support 40, corresponding to the number of phases.

Figure 2:
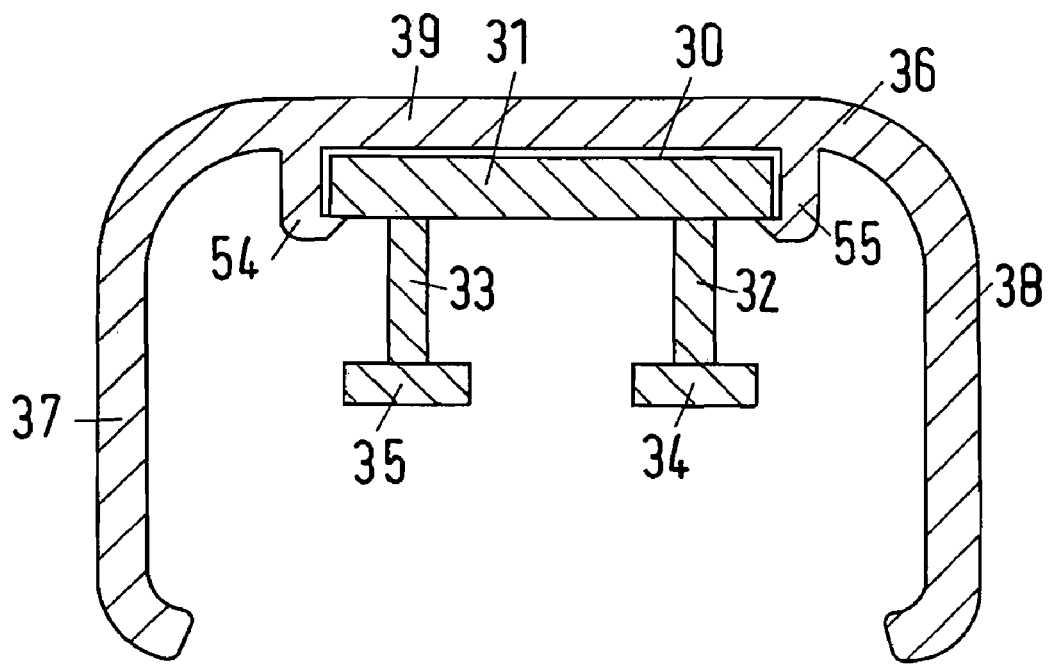
FIG. 2 shows another embodiment of the bus bar, also in cross section.

In the embodiment according to FIG. 2, a central section 30 is provided, which has a flat base section 31, on which fins 32 and 33, which run perpendicularly to it, and transverse fins 34 and 35, which are formed on them, are formed. This central section, with the base section 31, the fins 32, 33 and the transverse fins 34, 35, can be produced by extrusion, and takes the current-carrying function of the bus bar.

A C-shaped shield section profile 36 is associated with this central section 30, and corresponding to the shield section 19 and 20, has legs 37 and 38, which are themselves C-shaped, and are to be connected to a middle section or coupling piece 39. On the inside of the middle section 39 of the C shape, locking lugs 54 and 55, behind which the base section 31 can be locked, are formed. This shield section profile 36 with the locking lugs 54, 55 can also be produced by extrusion, from either aluminum or an electrically conductive plastic.

Figure 3:
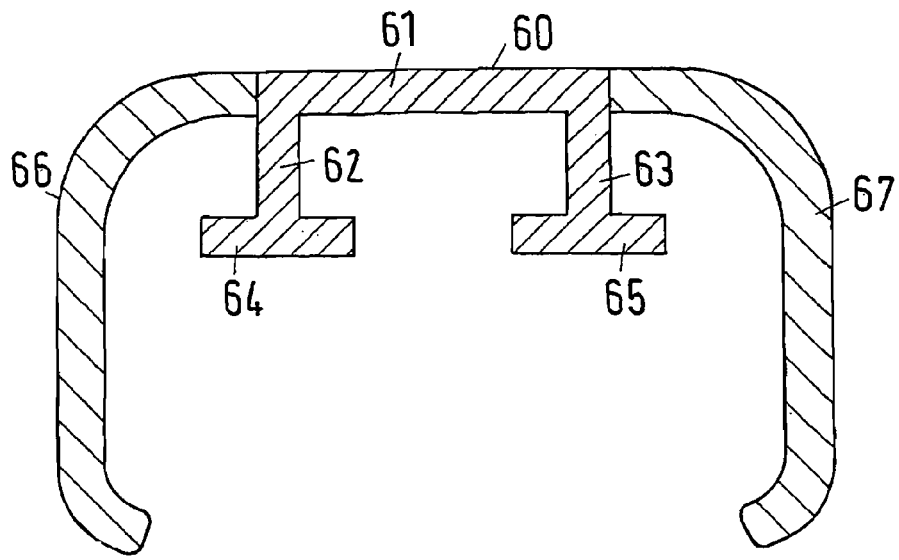
FIG. 3 shows a third embodiment of a bus bar.

In the version according to FIG. 3, a central section 60 with a base section 61, on the longitudinal edges of which fins 62, 63 running perpendicularly to it are formed, is provided, transverse fins 64 and 65 in turn connecting to the free ends of the fins 62, 63. On both sides of the base section 61, C-shaped shield sections 66 and 67 corresponding to the shield sections 19 and 20 are attached, for example by the central section 60 being partly run into the shield sections 66 and 67.

In the case of the versions according to FIGS. 2 and 3, a good electrically conducting connection between the central section 30 and the shield section 36, or 60 and the shield sections 66, 67, is essential, so that these too can exercise their function.

The length of the legs 19, 20; 37, 38; 66, 67 depends on the size of electrically conducting components which can be fixed to the central section 11, so that in every case, these electrically conducting components are covered by the shield section legs.

The invention claimed is:

1. A current conductor for an electrical device comprising:
an electrically conducting central section having a first side and a second side, and configured to receive at least one inserted electrical component; and
two electrically conducting shield sections each disposed on one of the first side and the second side and configured to shield against an electric field,
wherein the shield sections cover the central section and the at least one inserted electrical component.

2. The current conductor as recited in claim 1, wherein the electrical device is a bus bar conductor.

3. The current conductor as recited in claim 2, wherein the bus bar conductor is for an electrical medium voltage installation.

4. The current conductor as recited in claim 1, wherein the central section includes an extruded material.

5. The current conductor as recited in claim 1, wherein the shield sections include an extruded material.

6. The current conductor as recited in claim 1, wherein the central section and the shield sections are integrally formed of a same extruded material.

7. The current conductor as recited in claim 1, wherein the central section and the shield sections each include an aluminum or an aluminum alloy.

8. The current conductor as recited in claim 1, wherein the shield sections include an electrically conducting plastic.

9. The current conductor as recited in claim 1, wherein the shield sections include two concave sides facing each other to form a C-shape.

10. The current conductor as recited in claim 1, wherein the central section includes a base section having a first side edge and a second side edge and extending lengthwise, and wherein the shield sections connect to the first side edge and the second side edge.

11. The current conductor as recited in claim 10, wherein the base section includes a plurality of fins arranged at intervals from each other, each fin including a transverse bead, and wherein the inserted electrical component is fixable between adjacent transverse beads.

12. The current conductor as recited in claim 11, wherein each of the at least one transverse bead forms an L-shape or T-shape with a corresponding fin.

13. The current conductor as recited in claim 12, further comprising at least one lug, wherein the first side edge and the second side edge of the base section are configured to be locked using the at least one lug.

14. The current conductor as recited in claim 13, wherein the at least one lug is a support for the current conductor.

15. The current conductor as recited in claim 12, further comprising at least one lug, wherein the L-shape or T-shape are configured to be locked using the at least one lug.

16. The current conductor as recited in claim 15, wherein the at least one lug is a support configured to support the current conductor.

17. The current conductor as recited in claim 1, wherein the shield sections are joined to each other using a coupling piece, and wherein the central section is fixed to coupling piece within a space formed by the shield sections.

18. The current conductor as recited in claim 17, wherein the central section is lockable to the coupling piece.

19. The current conductor as recited in claim 8, wherein the central section is disposed adjacent to the shield sections.

* * * * *